UNITED STATES PATENT OFFICE.

PAUL HÜSSY AND MAX HARTMANN, OF BASEL, SWITZERLAND, ASSIGNORS TO SOCIETY OF CHEMICAL INDUSTRY IN BASLE, OF BASEL, SWITZERLAND.

CADMIUM COMPOUNDS OF THE ACRIDIN SERIES, AND A PROCESS OF MAKING THE SAME.

1,228,926.    Specification of Letters Patent.    Patented June 5, 1917.

No Drawing.    Application filed April 7, 1917.    Serial No. 160,556.

*To all whom it may concern:*

Be it known that we, PAUL HÜSSY, physician, and MAX HARTMANN, chemist, both citizens of the Swiss Republic, and residents of Basel, Switzerland, have invented new and useful Cadmium Compounds of the Acridin Series, and a Process of Making the Same, of which the following is a full, clear, and exact specification.

We have found that therapeutically valuable disinfectants of the acridin series are obtained by acting with a soluble cadmium salt, on corresponding quantities of the bases or salts of acridin dyestuffs, which may be alkylated at the acridin nitrogen, in presence of a convenient solvent, as for instance water or alcohol. The thus obtained well defined crystalline compounds possess a marked bactericide action.

For the preparation of the new compounds there can be added, for instance, to a solution as concentrated as possible, of the desired acridin dyestuff salt in a convenient solvent as, for instance, water or alcohol, a likewise concentrated solution of a cadmium salt soluble in the employed solvent, whereupon the crystallization of the cadmium compound formed begins mostly after a short time and can be completed by cooling or, if desired, by adding a convenient precipitant, as, for instance, ether. The separation of the new compounds is effected in the usual manner by filtering, washing and drying.

The new disinfectants constitute red to brown powders, which dissolve in water to orange-yellow to red-brown solutions, in alcohol, acetic ether, glacial acetic acid and acetone to solutions showing after dilution yellow-green fluorescences and in concentrated sulfuric acid with an intense green. Even when greatly diluted, their solutions still strongly act on bacteria to check the growth thereof.

The process is illustrated by the following examples:

Example 1: 335 gr. of the hydrochlorate of the acridin dyestuff methylated at the acridin nitrogen, obtained in the known manner by heating 2:7-dimethyl-3:6-diaminoacridin with methyl chlorid under pressure, are dissolved in a little hot water and to the obtained solution is added a solution of 188 gr. of cadmium chlorid in hot water. The new cadmium compound separates immediately as lumps which disintegrate by friction to tile-red crystals. The product is dried by suction, washed with alcohol and ether and dried. It constitutes a tile-red powder soluble in water with an orange-yellow coloration and in concentrated sulfuric acid with a green fluorescence.

Example 2: To 12 parts of 3:6-diaminoacridin suspended in a little hot water is added hydrochloric acid until the mass shows with Congo a feeble acid reaction. In the solution of 3:6-diaminoacridin hydrochlorate is then poured a hot solution of 15 parts crystallized cadmium chlorid in a little water. The separation of the new brown cadmium compound begins immediately. After standing for several hours it is isolated by filtration and suction, washed with a mixture of alcohol and ether and dried in an exsiccator. It constitutes a brown powder, soluble in water with a yellow-green fluorescence, in alcohol to a red-brown solution showing also after dilution a green fluorescence, and in sulfuric acid with a brown-green fluorescence and insoluble in ether, chloroform and benzene.

Example 3: 4.7 parts of the acridin dyestuff corresponding to the formula

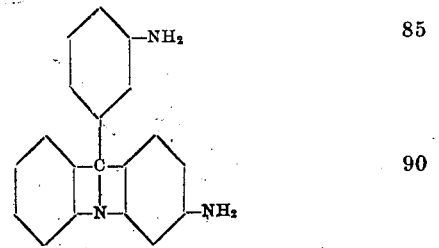

are dissolved in 100 parts of hot alcohol containing 3 parts of concentrated hydrochloric acid. To the filtered solution are added 4.4 parts of crystallized cadmium chlorid dissolved in 20 parts of alcohol and the mass is let to cool. After standing for 12 hours, the separated crystals are filtered off, dried by suction and washed first with a little alcohol and afterward with ether and dried in an exsiccator. The obtained product is a deep-brown powder dissolving in water to a red-brown solution showing after dilution a yellow-green fluorescence, likewise in alcohol, in sulfuric acid with a yellow-green fluorescence and insoluble in ether, chloroform and benzene.

Instead of those indicated in the examples, other acridin dyestuffs can be transformed into cadmium compounds showing analogous properties. For the cadmium chlorid employed in the examples other convenient cadmium compounds can be employed. Also the other conditions may be varied within wide limits.

What we claim is:

1. The herein described process for the manufacture of cadmium compounds of the acridin series, consisting in acting on an acridin dyestuff with a soluble cadmium salt in presence of a solvent.

2. The described process for the manufacture of cadmium compounds of the acridin series, consisting in acting on an acridin dyestuff alkylated at the acridin nitrogen with a soluble cadmium salt, in presence of a solvent.

3. As a new product, the herein described cadmium compounds of the acridin series, constituting red to brown powders, soluble in water with orange-yellow colorations, in alcohol, acetic ether, glacial acetic acid and acetone to solutions showing after dilution a yellow-green fluorescence and in concentrated sulfuric acid with an intense green fluorescence.

4. As a new article of manufacture, the herein described cadmium compound of the 2:7-dimethyl-3:6-diamidoacridin, methylated at the acridin nitrogen, which constitutes a tile-red powder soluble in water with orange-yellow coloration, in alcohol, acetic ether, glacial acetic acid and acetone with a yellow-green fluorescence and in concentrated sulfuric acid with a green fluorescence.

In witness whereof we have hereunto signed our names this sixth day of March, 1917, in the presence of two subscribing witnesses.

PAUL HÜSSY.
MAX HARTMANN.

Witnesses:
 CARL O. SPAMER,
 LYDIA UEBELE.